United States Patent
Wallace et al.

(10) Patent No.: US 10,867,259 B2
(45) Date of Patent: Dec. 15, 2020

(54) UNIFIED SERVICE MODEL FOR BUSINESS SERVICE MANAGEMENT

(75) Inventors: Darius Wallace, Sunnyvale, CA (US); Troy Lee Cline, Leander, TX (US); Cornelis Anthony Winkler Prins, Los Gatos, CA (US); Matthew Dennis Connors, Half Moon Bay, CA (US)

(73) Assignee: BMC SOFTWARE, INC., Houston, TX (US)

(*) Notice: Subject to any disclaimer, the term of this patent is extended or adjusted under 35 U.S.C. 154(b) by 559 days.

(21) Appl. No.: 12/650,302

(22) Filed: Dec. 30, 2009

(65) Prior Publication Data
US 2010/0223166 A1    Sep. 2, 2010

Related U.S. Application Data

(60) Provisional application No. 61/145,068, filed on Jan. 15, 2009.

(51) Int. Cl.
*G06Q 10/00* (2012.01)
*G06Q 10/10* (2012.01)
*G06Q 40/00* (2012.01)

(52) U.S. Cl.
CPC ........... *G06Q 10/00* (2013.01); *G06Q 10/103* (2013.01); *G06Q 40/12* (2013.12)

(58) Field of Classification Search
CPC ....... G06Q 10/00; G06Q 40/12; G06Q 10/103
See application file for complete search history.

(56) References Cited

U.S. PATENT DOCUMENTS

| | | | |
|---|---|---|---|
| 6,983,321 B2 | 1/2006 | Trinon et al. | |
| 7,099,936 B2 | 8/2006 | Ims et al. | |
| 7,617,073 B2 | 11/2009 | Trinon et al. | |
| 8,073,721 B1 * | 12/2011 | Lewis | 705/7.12 |
| 2005/0071182 A1 | 3/2005 | Aikens et al. | |

(Continued)

OTHER PUBLICATIONS

IT Service Management Forum, "An Introductory Overview of ITIL(R) V3," 58-pgs., copyright 2007, see pp. 14-16, 24, 44, 46, & 50-51.

(Continued)

*Primary Examiner* — Florian M Zeender
*Assistant Examiner* — Whitney Poffenbarger
(74) *Attorney, Agent, or Firm* — Brake Hughes Bellermarm LLP

(57) ABSTRACT

A unified service model method is used for Business Service Management of a computing infrastructure. In the model, service offerings are defined for a business service, and one or more service level targets are associated with each of these offerings. The business service is associated with one or more technical services that support the business service. These technical services are delivered by actual component in a computing infrastructure. In the model, service offerings are associated with the technical services, and service level targets are associated with each of these offerings. A customer defined in the model subscribes to one of the service offerings of the business service. As business services are provided, the unified service model combines the service offerings tying the business and technical services to the associated service level targets, and administrators can manage the services and IT components using the unified service model.

17 Claims, 8 Drawing Sheets

(56) References Cited

U.S. PATENT DOCUMENTS

| | | |
|---|---|---|
| 2005/0177545 A1 | 8/2005 | Buco et al. |
| 2006/0014751 A1* | 1/2006 | Hoffmann et al. ............ 514/251 |
| 2006/0031390 A1 | 2/2006 | Motoyama et al. |
| 2006/0074751 A1* | 4/2006 | Kline et al. ..................... 705/14 |
| 2006/0085544 A1* | 4/2006 | Chen et al. .................... 709/226 |
| 2006/0136459 A1 | 6/2006 | Trinon et al. |
| 2006/0161466 A1 | 7/2006 | Trinon et al. |
| 2006/0190583 A1* | 8/2006 | Whalen ......................... 709/223 |
| 2006/0294232 A1* | 12/2006 | Gonsalves et al. ........... 709/224 |
| 2007/0233690 A1 | 10/2007 | Bruchlos et al. |
| 2008/0010293 A1* | 1/2008 | Zpevak et al. ................. 707/10 |
| 2008/0021918 A1* | 1/2008 | Rao ............................. 707/102 |
| 2008/0117808 A1 | 5/2008 | Sandstrom et al. |
| 2008/0195402 A1* | 8/2008 | Dube et al. ....................... 705/1 |
| 2008/0235703 A1* | 9/2008 | Crawford et al. ............ 718/104 |
| 2009/0157723 A1 | 6/2009 | De Peuter et al. |
| 2009/0259630 A1* | 10/2009 | Goodman et al. ............... 707/3 |
| 2010/0169225 A1* | 7/2010 | Lymbery ............... G06Q 10/00 705/80 |

OTHER PUBLICATIONS

ILX Group Plc., "ITIL: The Key Differences Between Versions 2 and 3," 6-pgs., copyright 2007.
"ITIL(R) Glossary of Terms, Definitions and Acronyms," 57-pgs., dated May 11, 2007, see pp. 43, 46, 52, & 54.
ILX Group Plc., "ITIL(R) V3 Process Model," 2-pgs., dated Nov. 2007.
IT Service Management Forum, "ITIL(R) Version 3 Road Show," 137-pgs., undated, see pp. 20-21, 39, & 62.

* cited by examiner

UNIFIED SERVICE MODEL FOR BUSINESS SERVICE MANAGEMENT

CROSS-REFERENCE TO RELATED APPLICATIONS

This is a non-provisional of U.S. patent application Ser. No. 61/145,068, filed 15 Jan. 2009, which is incorporated herein by reference in its entirety and to which priority is claimed.

BACKGROUND

Business Service Management ("BSM") is a dynamic Information Technology ("IT") management strategy that is supported by technology, people, and processes. Using BSM methodologies, an organization's IT operation can be aligned to the business goals of the organization. When these are well aligned, staff of an IT service provider can monitor, manage, and improve the IT systems and applications used to support critical business processes. The BSM methodologies also enable IT staff to understand and predict how technology changes may affect the business and how changes in the business may affect the IT infrastructure.

Typically, a business service consists of a number of IT components or resources that satisfy business needs or objectives in a computing infrastructure. The resources of the business service can include management processes, hardware, software, facilities, people, etc. Modeling business services is one way to organize resources, determine impact relationships between resources, manage how and when resources are used, to track the use of resources, etc. It will be appreciated that business services can encompass thousands of resources and relationships so that modeling the business services can be challenging. In large computing environments or enterprises, for example, multiple users may use various business services in different ways and at different times. Additionally, the multiple users may access the business services using different resources of the computing environment.

With these complexities and challengers, service providers need to be able to design, track, and manage the services they provide to customers in a flexible and straightforward manner. Current approaches for service modeling focus on tying the IT infrastructure to representations of business services. These approaches have enabled administrators to analyze the impact of events, perform some degree of cost rollup, and manage incidents and changes based on the services affected. Unfortunately, the current approaches make it difficult for service providers to tailor and manage services to meet customers' needs while still being able to control costs.

The subject matter of the present disclosure is directed to overcoming, or at least reducing the effects of, one or more of the problems set forth above.

SUMMARY

The subject matter of the present disclosure generally relates to an architecture for Business Service Management and, more particularly relates, to a system and method that uses a unified service model to manage business and technical services in a computing infrastructure. The unified service model and associated architecture disclosed herein help an IT service provider offer, manage, and track the services it provides for customers. The service provider defines services (service utility) and service level targets (service warranty) to construct a unified service model that aligns the provider's services to customers' business needs. Using service utility and warranty, the unified service model follows the description of an IT service found in the Information Technology Infrastructure Library V3 (ITILv3). In particular, the ITILv3 describes an IT service as a combination of two concepts—a service utility (what the IT service does) and a service warranty (how well the IT service performs the service). Although the ITILv3 describes an IT service in this way, the ITILv3 does not actually define how to implement these concepts in an IT infrastructure.

Using constructs defined in the disclosed unified service model, however, the service provider can create unique service offerings that include multiple combinations of a primary service (utility) with varying types of service level targets (warranty). Using these service offerings, the service provider can offer different levels of the same service at different price points to different customers. For example, one service offering may include 24-hour×7-day support, while another service offering may include 8-hour×5-day support. This allows the service provider to tailor the services it provides and the level of service given to a particular customer's business needs. Also, the service provider can use the constructs to track and manage the services provided in ways not currently available.

In particular, the unified service model uses a class structure that defines technical and business services, which are the service utility or what the IT service does. The class structure also separately defines service level targets, which are the service warranties or how well the IT service performs the services. In the class structure, these two constructs are combined together as an offering (service offering or requestable service offering) for implementing these constructs in the service model of a computing infrastructure.

In this way, the offerings combine services (the service utility) and service level targets (the service warranty) and enables a service provider to better align business and technical services to a customer's business needs. For example, the service provider can create offerings in the unified service model that have multiple combinations of a primary service (utility) with varying types of service level targets (warranty). Using these offerings, service providers can then readily offer different levels of the same service at different price points to different customers.

Secondly, the service provider can associate organizations or even individual users in the unified service model with the technical services that support their business functions. With such associations, the service provider can understand which users may be affected by an incident or a planned outage. (An incident can be any unexpected interruption in IT services, a reduction in the quality of service provided, or any other failure.) As an example, an e-mail service may be supported by separate portions of an infrastructure—one for North America (NA) and one for Europe, Middle East, and Africa (EMEA). Each of these infrastructure portions may be allowed to roll up under a separate technical service in the unified service model. However, both technical services are forced to roll up under the same service offering of the same business service, and the supported organizations are associated with the relevant technical service. Due to these associations, the service provider can correctly determine which organizations may affected by an outage in the technical service for the EMEA e-mail.

Thirdly, the service provider can associate particular customers with a provided service under a contract. The unified service model uses contracts to define the particular details of how service offerings are used by customers, which can be either internal or external organizations. Based on these details, the unified service model can produce an accurate picture of which customer is using a particular service and when that use is to begin or expire. Additionally, the unified service model can even track revenue or other measure (penalties, rewards, time, usage fees, charges, etc.) for the particular service offerings, and these tracked measure can be used for various forms of accounting and reporting.

For these reasons, the unified service model of the present disclosure establishes a common structure that provides a holistic view of services provided by a service provider to a business enterprise. This structure acts as a single source of service definitions across IT processes and can be leveraged consistently by other software applications used to manage the IT processes. The foregoing summary is not intended to summarize each potential embodiment or every aspect of the present disclosure.

DETAILED DESCRIPTION

A. Architectural Overview

Figure 1:
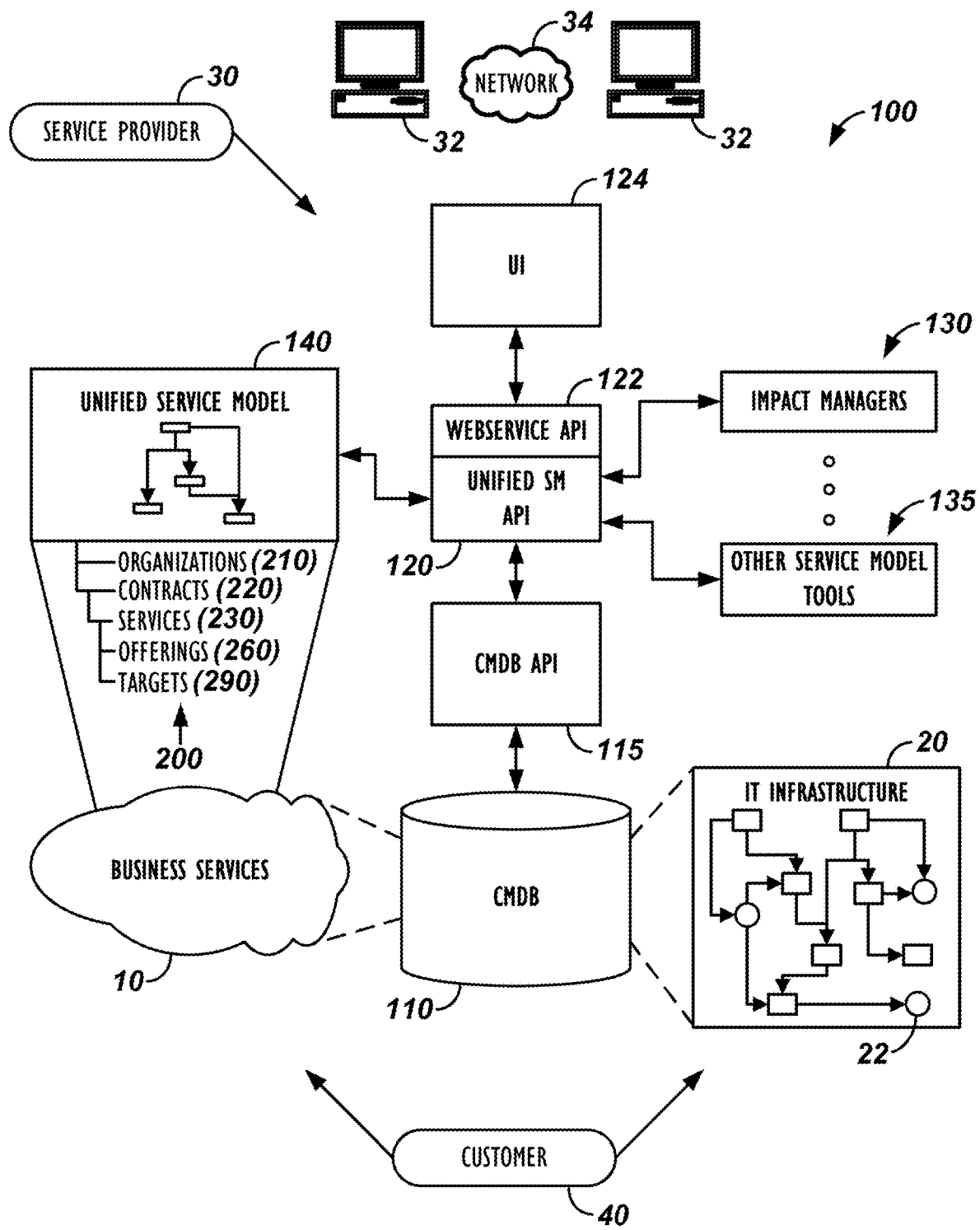
FIG. 1 schematically illustrates a service model architecture for Business Services Management (BSM) according to the present disclosure.

FIG. 1 schematically illustrates a service model architecture 100 for Business Services Management (BSM). The architecture 100 relates various business services 10 with an IT infrastructure 20 so a service provider 30 can manage (and customers 40 can use) the business services 10 on the IT infrastructure 20 in a managed and efficient manner, as is a typical purpose of service modeling. In contrast to previous approaches, however, the architecture 100 of the present disclosure uses a unified service model 140 that provides flexible tools for managing and using the business services 10 on the IT infrastructure 20.

Before discussing particular details of the unified service model 140, discussion first turns to some background description. As is known, Business Services Management (BSM) links the business services 10 (i.e., business-related applications, processes, activities, transactions, etc.) to various IT components or resources 22 (i.e., various software and hardware features) of the IT infrastructure 20.

In general, the IT infrastructure 20 can include any of the various components 22 used in an enterprise computing environment to run and execute services. As such, the infrastructure 20 can have general-purpose computers, mainframe computers, servers, data storage systems, switches, terminals, routers, computer networks, applications, software, etc.—each of which is known in the art and not detailed herein. As is known, problems with one IT component 22 in the infrastructure 20 can impact other IT components 22 and can also impact the business services 10. As its purpose, therefore, the service model architecture 100 helps the service provider monitor and manage IT within a business perspective.

In the current architecture 100, a configuration management database (CMDB) 110, which can be a relational database or other structure, stores data for the unified service model 140 by holding and organizing information for various defined classes, including business services, persons, organizations, service offerings, etc., as detailed below. The CMDB 110 typically contains data about managed IT components 22 (e.g., configuration items such as computer systems, application software, etc.), attributes of the components 22, and relationships among these elements. The CMDB 110 may also contain process artifacts (e.g., incident and change records). More particular details of the CMDB 110 are known in the art and are not detailed herein.

Various APIs enable users (e.g., an administrator of service provider 30) interface with the CMDB 110 so the users can manage the business services 10 and the IT infrastructure 20. For example, the CMDB 110 has a CMDB API 115. The user can then use a user interface 124 to access a web service API 122 and a unified service model (USM) API 120 to interface with the CMDB 110 via its CMDB API 115. The USM API 120 is a programmatic interface offering for working with business services 10, and the USM API 120 also handles conventional impact information for service-related classes.

To actually access the architecture 100 and use the user interface 124, the user at the service provider 30 can have one or more computers 32, which can be remote terminals or any other computing devices, coupled to one or more networks 34. These one or more computers 32 can be programmed with BSM functions and can be part of or separate from the IT infrastructure 20 being monitored. The one or more computers 32 may have web browsers or other dedicated applications for accessing the APIs, user interface 124, etc. via any available form of network.

Using the available interface components, the user can create and maintain the unified service model 140 used to manage the business services 10 on the IT infrastructure 20. In turn, data for the unified service model 140 can be stored in the CMDB 110. The interface components also allow the user to use other tools for managing the business services 10 and IT infrastructure 20. The management tools can include impact managers 130 and other service model tools 135 known and used in the art.

For example, data in the CMDB 110 can be used by the impact managers 130 and other tools 135 to manage the business services 10 and the infrastructure 20. Details related to impact management and software components of impact managers 130 are disclosed in U.S. Pat. No. 6,983,321 and in U.S. Pat. No. 7,617,073, which are both incorporated herein by reference. Briefly, the impact managers 130 are software components distributed throughout the infrastructure 20 of the enterprise computing system. The impact managers 130 have event-processing engines that collect, process, and store events occurring in the infrastructure's components 22. The engines associate events with information pertaining to the components 22 and other aspects of the enterprise computing system and determines their status. In turn, information from the impact managers 130 is used to assess the impact of events on business services 10 and other processes of the enterprise computing system.

The collection of information about components 22, events, and their impact relationships can, therefore, form part of the unified service model 140, although the present disclosure does not directly focus on such information. Although the unified service model 140 may stored or be associated with the data of the CMDB 110, the real-time assessment of the impact that reported problems or events have on the unified service model may not be carried out by the CMDB 110. Instead, the impact managers 130 report such problems and events so they can be reflected in the unified service model 140. To enable the impact managers 130 to assess various events, information about the unified service model 140 can be distributed and published to the impact managers 130. In turn, the impact managers 130 work on their own local copy of their portion of the unified service model 140. Accordingly, the BSM architecture 100 associates impact managers 130 that manage particular components 22 of the infrastructure 20, and the BSM architecture 100 includes those associations in the unified service model 140.

As noted above, the unified service model 140 can be similar in some respects to a conventional service model and can include features related to impact management and other tools. However, the unified service model 140 of the present disclosure has a class structure 200 that help users create, manage, and monitor the business services 10 on the IT infrastructure 20 effectively and with more flexibility than currently available. As only briefly shown in FIG. 1, the class structure 200 includes organizations 210, contracts 250, services 260, offerings 270, and targets 290. As used herein, the contracts 220 are supplied for particular organizations 210, who can be organizations, persons, groups, users, etc. Some organizations 210 are customers of the contracts 220, and other organizations 210 are suppliers or providers for the contracts 220. The services 230 fall under the contracts 220, and each service 230 contains offerings 270 and targets 290. As used herein, a service 230 delivers value to a customer organization 210 by providing outcomes that the organization 210 wants to achieve without the organization 210 actually needing to own the specific costs and risks involved.

However, the customer organizations 210 do not subscribe to the services 230. Instead, the customer organizations 210 subscribe to the offerings 270. For their part, the offerings 270 combine a primary service (utility) 230 with varying types of service level targets (warranty) 290. In general, each service 230 can have a one-to-many relationship with offerings 270, and the offerings 270 can have one or more service level targets 290. Each of these constructs will be discussed in more detail below.

B. Class Structure

Figure 2A:
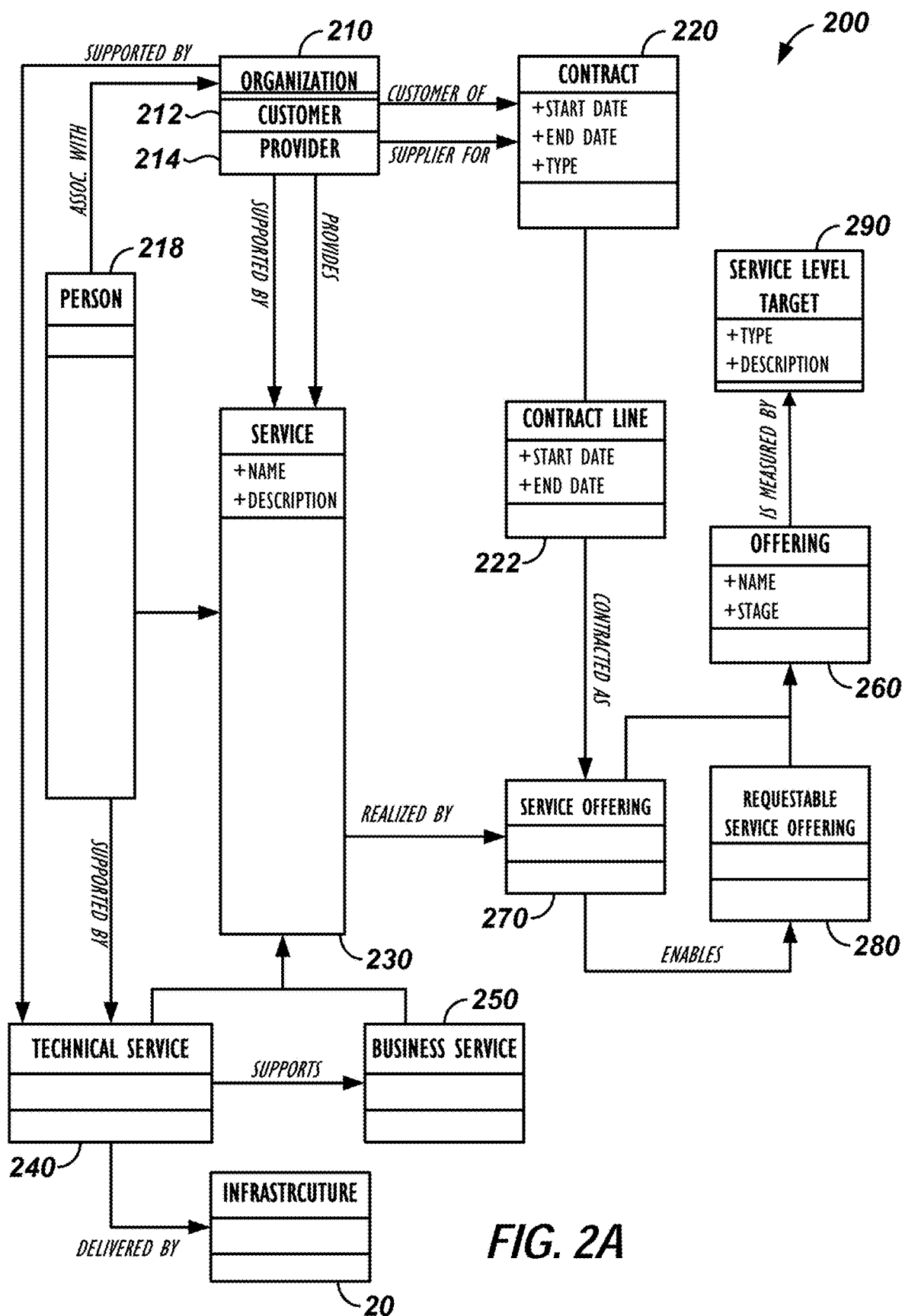
FIGS. 2A-2B show details of a class structure for a unified service model according to the present disclosure.

More details of the class structure 200 for the unified service model 140 are shown in FIG. 2A. The class structure 200 has a class for organizations 210, which can be defined in terms of organizations, departments, groups, customers, persons, end users, etc., each of which can be internal or external to the IT infrastructure (20). In general, the organizations 210 can represent individuals and groups of people who act as customers and establish agreements with a service provider or who act as end users and consume the services they are entitled to use. Moreover, the organizations 210 can represent individuals and groups of people who act as suppliers for agreements or providers of services.

In particular, a given organization 210 can be a customer of a particular contract 220 supplied for the organization 210. (This type of organization 210 may be referred to herein as either a customer organization or simply a customer 212.)

By contrast, a given organization 210 can be a supplier of a contract 220 for another organization 210. (This type of organization 210 may be referred to herein as a supplier organization, a supplier, a provider organization, or even a service provider 214.)

The class structure 200 also has classes for persons 218, who are associated with an organization 210. These persons 218 may be end users of the customer organizations 212. In addition, these persons 218 can be associated with particular providers 214 and services 230 and can be managers or coordinates that handle services, releases, changes, problems, availability, capacity, continuity, and the like. Such persons 218 can be departments, administrators, IT personnel, etc. of the service provider 214 designated to support a given service 230 for a particular customer 212.

The contract 220 is an agreement for service, support, or any other suitable arrangement between a service provider 214 and a customer 212, and the contract 220 can define a start date, an end date, and a type of agreement. Further details for the contract 220 are provided by contract line items 222 in the contract 220, which itself acts as a container object for one or more contract line items 222.

Each of these line items 222 establishes a specific agreement between a service provider 214 and an associated customer 212 so the customer 212 is covered under a particular contract line 222. Information associated with the line items 222 can include contract details or terms, price amounts, costs, units-of-measure, etc. More particularly and as will be discussed later, a contract line item 222 can define one or more measures (price amounts, costs, units-of-measure, etc.) to track one or more events occurring in the service model 140 relative to the contract 220 and the associated organization(s) 210 and service offering(s) 270. Such events can include incidents (problems, outages, lost connectivity, slow response time, etc.), service requests, service usages, or other service-related items or activities that can have a measure or value associated with them. The event in the contract line item 222 can then be tracked, and the measure can be used to maintain an accounting for the tracked event. Because the customer 210 and service offering(s) 270 are associated together by the contract 222, the accounting for the tracked events can then be used to measure the value, cost, penalties, etc. for offering the services 230 by the provider(s) 214 to the customer 212.

For example, the event in the contract 220 may be for an incident, such as lost connectivity, related to a service offering 270. The measure for this incident may be a penalty charged to the service provider 214 for failing to meet a service level target 290 associated with the service offering 270. When the lost connectivity occurs, the incident can be tracked, and the penalty can be assessed if the service level target (e.g., resolution within 5-hours) has not been met. These and other arrangements are discussed below.

The customer organizations 212 are supported by the services 230, and the provider organizations 214 provide the services 230. As noted previously, the services 230 define a high level "utility" according to ITILv3. The class structure 200 defines two types of services 230 that include technical services 240 and business services 250. An example of a technical-type service 240 is a web service that handles e-mail traffic for customers of an enterprise. A business-type service 250 is a service that directly supports a business process, such as order management, Enterprise Resource Planning, etc. These types of services are only exemplary, and the services 240/250 can include any of the various types of services used in the BSM context.

As noted above, business customers 212 do not subscribe to the services 230. Instead, the customers 212 actually subscribe to offerings 260 (in particular service offerings 270) used to realize the services 230. An offering 260 can contain a name, description, version, cost, price, units-of-measure, and warranty details, as well as other details. The cost and price details associated with an offering allows a service provider (e.g., IT support) to set a price for an offering and track costs associated with the offering level in the offering level of the service model 140.

As shown in FIG. 2A, the customer 212 is associated with a service offering 270 via a contract line item 222 in the customer's contract 220 that is directly linked to the service offering 270. In general, a service offering 270 is part of a single service 230, but a service 230 may have several linked service offerings 270. For its part, a service offering 270 is the container object that brings the associated service 230 ("utility") and the services level targets 290 ("warranty") together in a way that establishes value to the customers 212.

The offerings 260 also include requestable offerings 280, which are also container objects. The requestable offering 280 is a subtype of an offering 260 and can be requested by a user as part of the service offering 270. The requestable offering 280 can having its own per request cost or price associated with it and can have its own linked service targets 290. Accordingly, the requestable offering 280 brings the service 230 ("utility") and the service level targets 290 ("warranty") together so that a customer 212 can make an actionable request related to the service 230. Some general examples of requestable offerings 280 include setting up a particular service agreement, creating a new account, resetting a password, and requesting additional disk storage, among other requestable activities.

As hinted to previously, the service level targets 290 define the "warranty" according to ITILv3 for the services 230. To do this, the service level targets 290 specify Key Performance Indicators (KPI's) or other measures used for measuring the performance or level of service of an offering 260 used to realize a service 230. An offering 260 (i.e., service offering 270 and requestable offering 280) can link to or contain one or more service level targets 290. Some general examples of service level targets 290 include setting a turnaround time period for resolving a problem, a pre-defined response time to a problem, a contracted amount of availability for a service, a capacity level, and available support hours (e.g. 24×7 or 8×5), among other targetable levels of a given service.

Figure 3A:
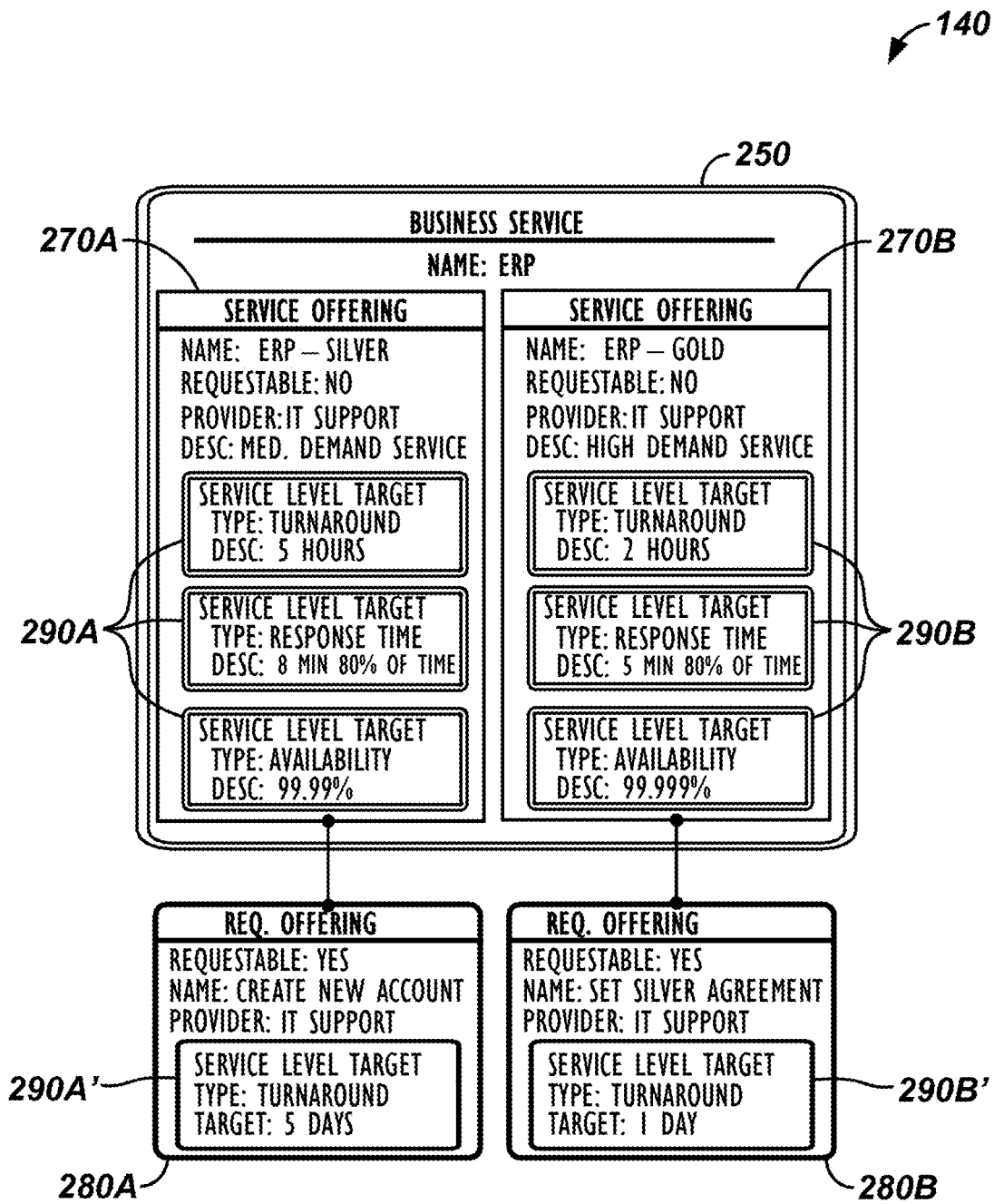
FIGS. 3A-3C show an example of a unified service model according to certain teachings of the present disclosure.

To help described these constructs of the architecture 200, FIG. 3A shows an example service offering 270A (named: ERP-Silver) that has several service level targets 290. A first of the service level targets 290 defines that turnaround for an incident should be handled within 5 hours. Another service level target 290 specifies that the service offering 270A be provided with a response time of 8 minutes at least 80% of the time, while a third service level target 290 specifies that the service offering 270A is available 99.99% of the time.

As also shown in FIG. 3A, an example requestable service offering 280A associated with the service offering 270A can be used for requests by users to create new accounts. This requestable offering 280A has its own service level target 290 that specifies that the user's request will take no longer than 5 hours to fulfill. As can be seen from the discussion of FIG. 3A, service level targets 290 can define different levels for different types of services depending on the implementation, and a service 230 can having different service offerings 270 linked to different customers 212 under various arrangements of contracts 220.

Figure 2B:
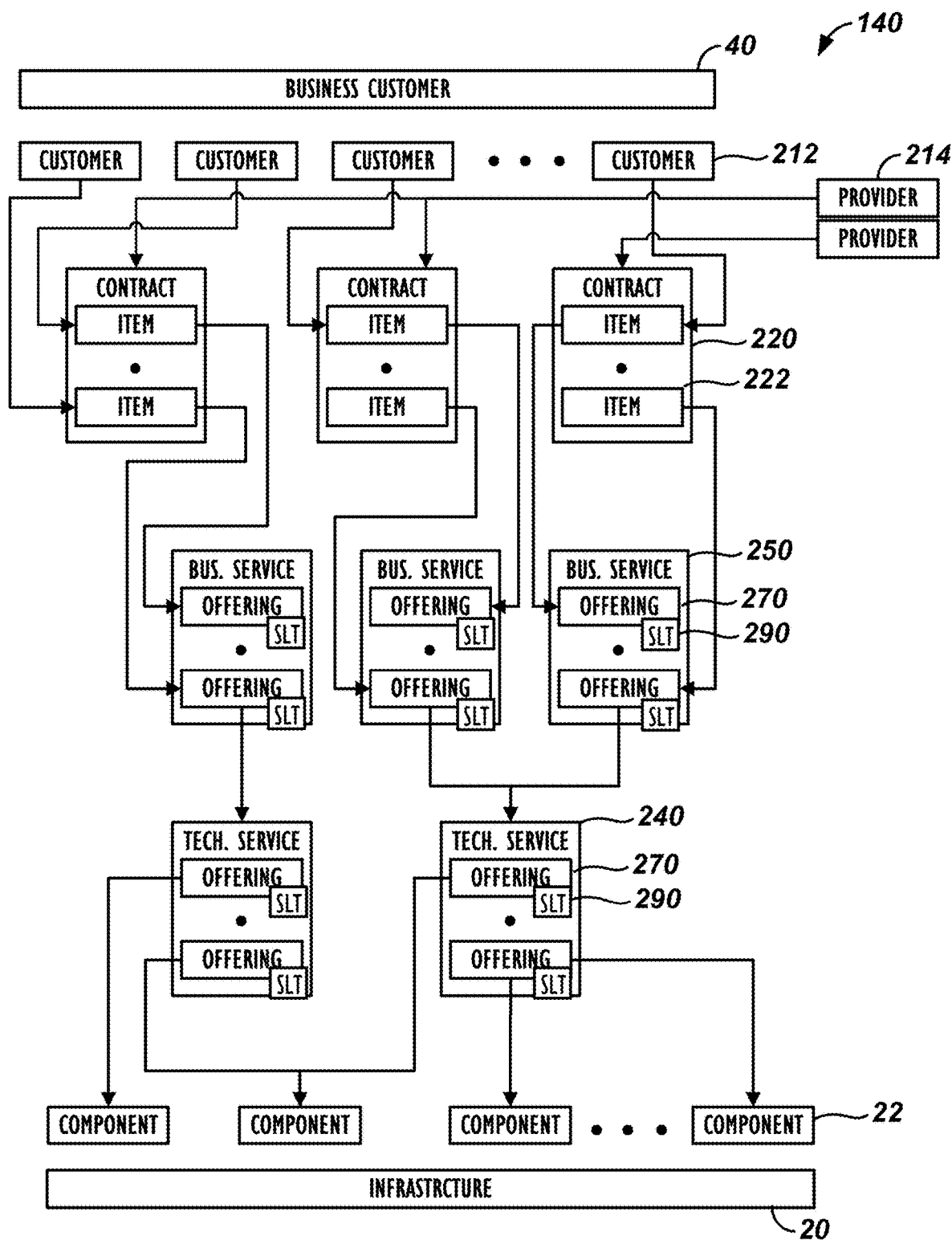

Turning now to FIG. 2B, a simplified arrangement of a unified service model 140 is shown having some of the constructs discussed previously. The unified service model 140 links the business needs of the business customer 40 to the infrastructure 20 used to provide various services for the business customer 40. In this general example, customers 212 (i.e., organizations, persons, etc.) of the underlying business customer 40 are customers of various contracts 220 and are covered under particular line items 222 of those contacts 220. Providers 214 supply these contracts 220 for the customers 210 so that the providers 214 are associated with various contracts, services, offerings, etc. in ways not explicitly shown.

Each contract line item 222 can specify different terms of the contract 220, such as start time, end time, etc. In turn, each contract line item 222 links directly to one or more service offerings 270 of business services 250 provided for the customers 212. As noted previously, the business services 250 are realized by one or more service offerings 270, and one or more service level targets 290 measure the level of service for each of the service offerings 270.

Each of the business services 250 is supported by one or more technical services 240. The technical service 240 is associated with the business service 250 and the service offering 270 that the technical service 240 supports. As with the business services 250, each technical service 240 has one or more service offerings 270 used to realize the technical service 240. Likewise, service level targets 290 measure the level of service for each of these service offerings 270. Finally, at the lowest end, the technical services 240 are delivered by one or more components 22 of the infrastructure 20.

As the class structure 200 and example model 140 in FIGS. 2A-2B show, services 230 (technical services 240, business services 250), service offerings 270, requestable service offerings 280, service level targets 290, and other constructs can be combined together in various ways. The various combinations can then be used to construct a versatile unified service model 140 that meets the flexible needs for a particular enterprise implementation in the BSM context.

Although not shown, the service model 140 can use some of the more typical components related to discovery of infrastructure components 22, business impact management, event detection, impact relationships, impact propagation, etc. for managing the services 230 and the infrastructure 20 with the model 140. These conventional service model components are known in the art and are not discussed herein for the sake of brevity. Some background of these service model components can at least be found in U.S. Pat. Nos. 6,983,321; 7,617,073; US Pat. Pub. No. 2006/0136459; US Pat. Pub. No. 2006/0161466; US Pat. Pub. No. 2009/0157723; each of which are incorporated herein by reference in their entirety.

C. Example Unified Service Model

Figure 3B:
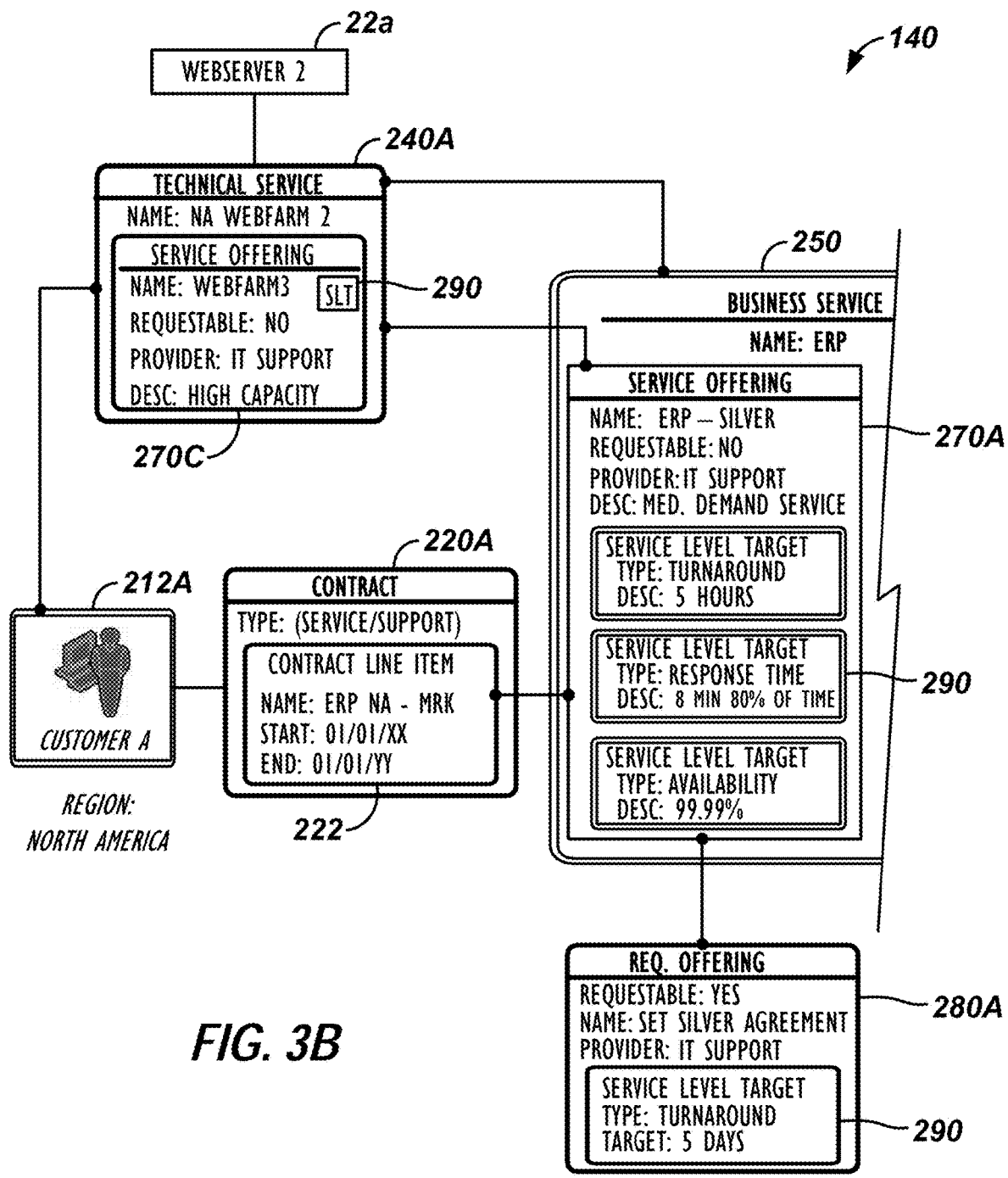
Figure 3C:
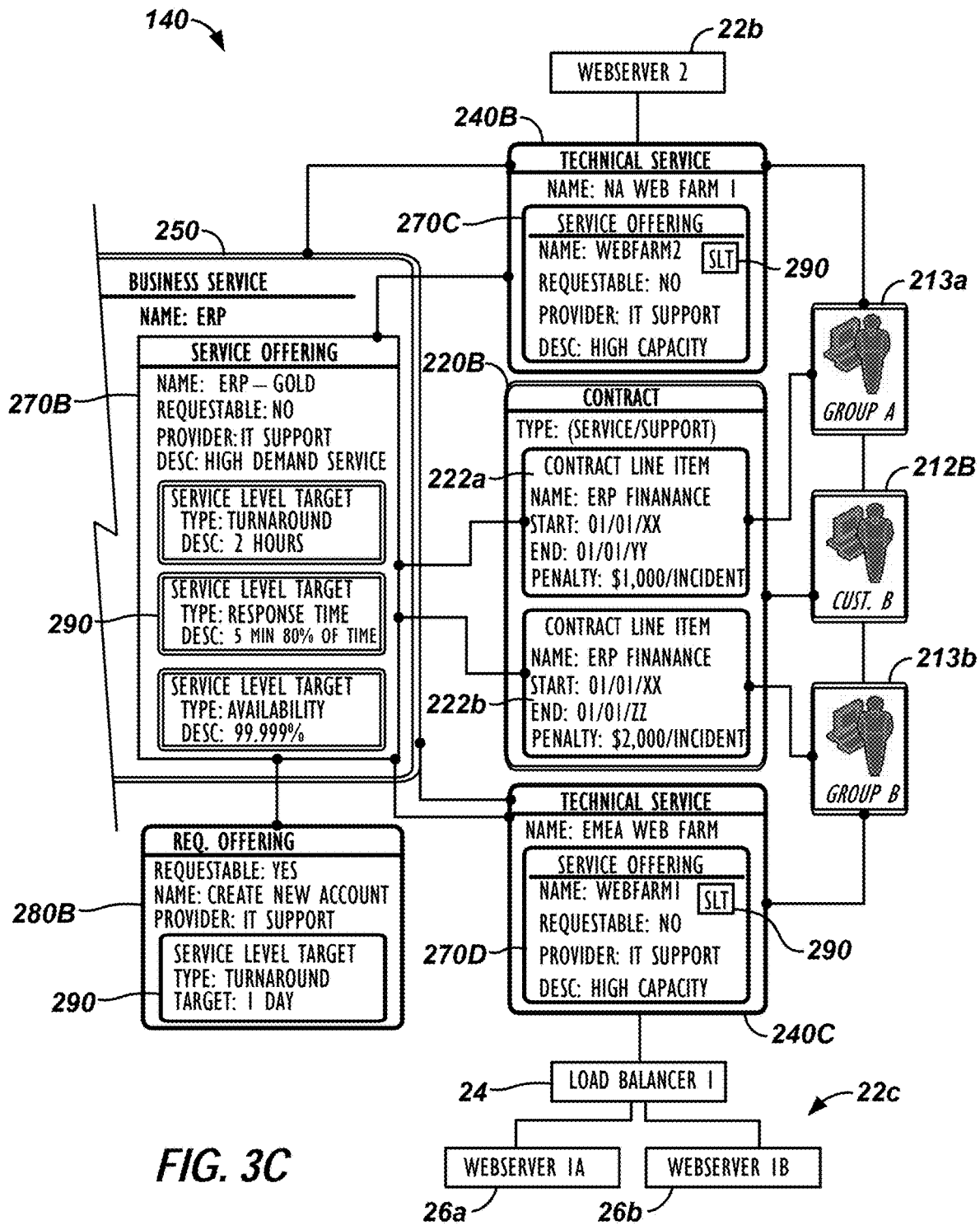

Benefits of the unified service model 140 constructed with elements of the class structure 200 will best be understood using particular examples. Turning then to FIGS. 3A-3C, elements of the architecture 100, the unified service model 140, and the class structure 200 are shown in an example arrangement.

In FIG. 3A, an example business service 250 (named: Enterprise Resource Planning "ERP") is shown. As noted previously with reference to FIGS. 2A-2B, the class structure 200 for the unified service model 140 allows several services offerings 270 to be constructed for a given service 230 (i.e., technical service 240 or business service 250) provided by service providers 214. Additionally, each of the different service offerings 270 under the same service 230 can be given their own service level targets 290.

As shown in FIG. 3A, for example, the ERP business service 250 contains two different service offerings 270A (named: ERP-Silver) and 270B (named: ERP-Gold). Another possible service offering with a higher level of service could include "Platinum," for example. Each of the different service offerings 270A-B can have a different set of service level targets 290. For example, the "Gold" service offering 270B has three service level targets 290B that are different (more stringent) than the targets 290A for the "Silver" service offering 270A.

In this example, each of the service offerings 270A-B has a requestable offering 280A-B associated with it. As its name implies, the requestable offering 280A-B can be requested by a customer. For example, the requestable offering 280A associated with the "Silver" service offering 270A can be requested by the customer to create a new account. This requestable offering 280A is provided by IT support and has its own service level target 290A', which in this example calls for a 5 day turnaround time to complete a customer's request for a new account.

As noted previously, a customer 212 falls under a contract 220 that links the customer 212 to one or more of the service offerings 270 in the unified service model 140. As shown in FIG. 3B, for example, a contract 220A is linked to the "Silver" service offering 270 of the ERP business service 250. The contract 220A has a contract line item 222 that establish a relationship between a service provider (214) and a particular customer 212A and sets the expectations between them. The customer 212A in this example is a marketing organization that is part of an enterprise, and the customer 212A can be located in a particular geographic region (i.e., Region A: North America). (For simplicity, provider organizations 214, such as IT support or the like, are not shown in FIGS. 3A-3C.)

According to the contract 220A, the service provider (i.e., IT support) provides service, support, and the like to the customer 212A, and the contract line item 222 specifies that the contract 220A starts and ends on particular dates. The contract line item 222 also specifies a $1,000 penalty to be charged to the service provider for each incident occurring in relation to the "Silver" service offering 270A provided to the customer 212A. In this way, the contract line item 222 can be used for accounting purposes when providing the business service 250 for the customer 212A under the contract 220A.

As also shown in FIG. 3B, another service 240A (named: North American "NA" WebFarm 2) is provided for the customer 212A. This service 240A is a technical service. In the IT industry, such a technical service usually refers to a certain type of infrastructure component or system (e.g., server, web farm, storage device, etc.) being provided or used. Accordingly, the technical service 240A has physical infrastructure components 22a related to it. In this example, the infrastructure component 22a includes a "Webserver 2" that is leveraged to provide the technical service 240A.

As shown, the technical service 240A is directly related to the ERP business service 250, because the ERP service 250 is supported by this technical service 240A. As with the ERP service 250, the technical service 240A also has one or more service offerings 270C associated with it to which the customer 212A subscribes. In this example, the service offering 270C (named: Webfarm 2) has its own definitions and service level targets 290. This service offering 270C is directly related to the business service's offering 270A that it supports.

As shown in FIG. 3C, a different contract 220B is associated with the "Gold" service offering 270B of the ERP business service 250. This contract 220B has two contract line items 222a-b that establish the relationship between service providers (214) and a customer 212B and sets the expectations between them. The customer 212B in this example is a finance organization of the enterprise.

According to the contract 220B, the service provider (i.e., IT support) provides service, support, and the like to the customer 212B in two ways. A first contract line item 222a is defined for a first group 213a of the customer 212B located in one geographic region (i.e., North America), while a second contract line item 222b is defined for a second group 213b located in another region (i.e., Europe, Middle East, and Africa or "EMEA"). As can be seen, each control line item 222a-b specifies the start and end dates of the contract 220B for its particular group 213a-b and has specific penalties for each incident occurring in relation to the associated the "Gold" service offering 270B provided to the customer 212B.

Each of the groups 213a-b is associated with a technical service 240B-C used to realize the ERP business service 250 for the groups 213a-b. For example, the technical service 240B (named: NA Web Farm1) is provided for the first group 213a associated with the first contract line item 222a, while the technical service 240C (named: EMEA Web Farm) is provided for the second group 213b associated with the second contract line item 222b. Because these are technical services 240B-C, they are delivered by infrastructure components 22b (Webserver 2) and 22c (load balancer 24 with webservers 26a-b), to which they are respectively linked.

As the contract line items 222 in the contracts 220A-B of FIGS. 3B-3C show, the unified service model 140 can produce an accurate picture of which customers 212 are using particular services 240/250 and when that use is to start and end. In other words, the service offering 270A in FIG. 3B is offered to the North American Marketing organization (as customer 212A) starting and ending at particular dates under the line item 222 of its contract 220A. These terms are different from the two contract line items 222a-b in FIG. 3C for the contract 220B offered to the Finance organization (as customer 212B) having separate groups 213a-b in different geographic regions.

As the contract line items 222 of FIGS. 3B-3C further show, the unified service model 140 can even track revenue or other measures for particular service offerings 270. For example, the contract line items 222a-b in FIG. 3B specify different penalty amounts per incident that occurs related to the contracted services 240/250 when they fail to meet the associated service level targets 290. In particular, the Finance organization 212B in FIG. 3C has decided to establish different expectations for the two groups 213a-b in NA and EMEA. The EMEA group 213b is supported by the EMEA Web Farm technical service 240C with its underlying infrastructure components 22c. This group's contract line item 222b indicates that if the expected level of support is not met, there will be a $2,000 per incident chargeback to the service provider (e.g., IT support). On the other hand, the contract line item 222a for the NA group 213a indicates a lower cost per incident chargeback because the associated technical service 270C has infrastructure components 22b located in North America, which may be easier to manage.

If anything goes down or there are any problems with the infrastructure components 22b-c associated with the technical services 240C-D, administrators of the service provider(s) (214) can use the service model 140 to determine which customer 212A-B, group 213a-b, end user, etc. may be impacted. In other words, an e-mail service for the Finance organization 212B may be supported by the separate infrastructure components—one 22b for North America (NA) and one 22c for Europe, Middle East, and Asia (EMEA) as discussed previously. Each of these infrastructure components 22b-c are rolled up under separate technical services 240C-D in the unified service model 140. However, both components 22b-c are be forced to roll up under the same ERP business service 250. Because the supported groups 213a-b are associated with the relevant technical services 240C-D, the group 213, end users, and the like who are affected by an outage in the technical service 240D for the EMEA e-mail may be correctly determined from the service model 140. In this way, administrators can use the unified service model 140 to better manage problems and maintain accounting for the business and technical services 240/250 provided to customers, organizations, groups, and the like. Although not shown, the same tracking and accounting can be achieved for those organizations 210, groups, persons, end users, etc. that are suppliers for the contracts and that provide the services 230.

D. Handling Incidents with Unified Service Model

To manage the various services 230, the service provider 30 can use a service desk environment in conjunction with the unified service model 140. The service desk environment acts as a central location for users of the provider's IT services to contact when there is an incident, problem, or the like associated with a provided service. The service desk environment can use automated software and manual input and interaction and may be at a centralized location, distributed to various regions, or maintained in a virtual environment.

Figure 4:
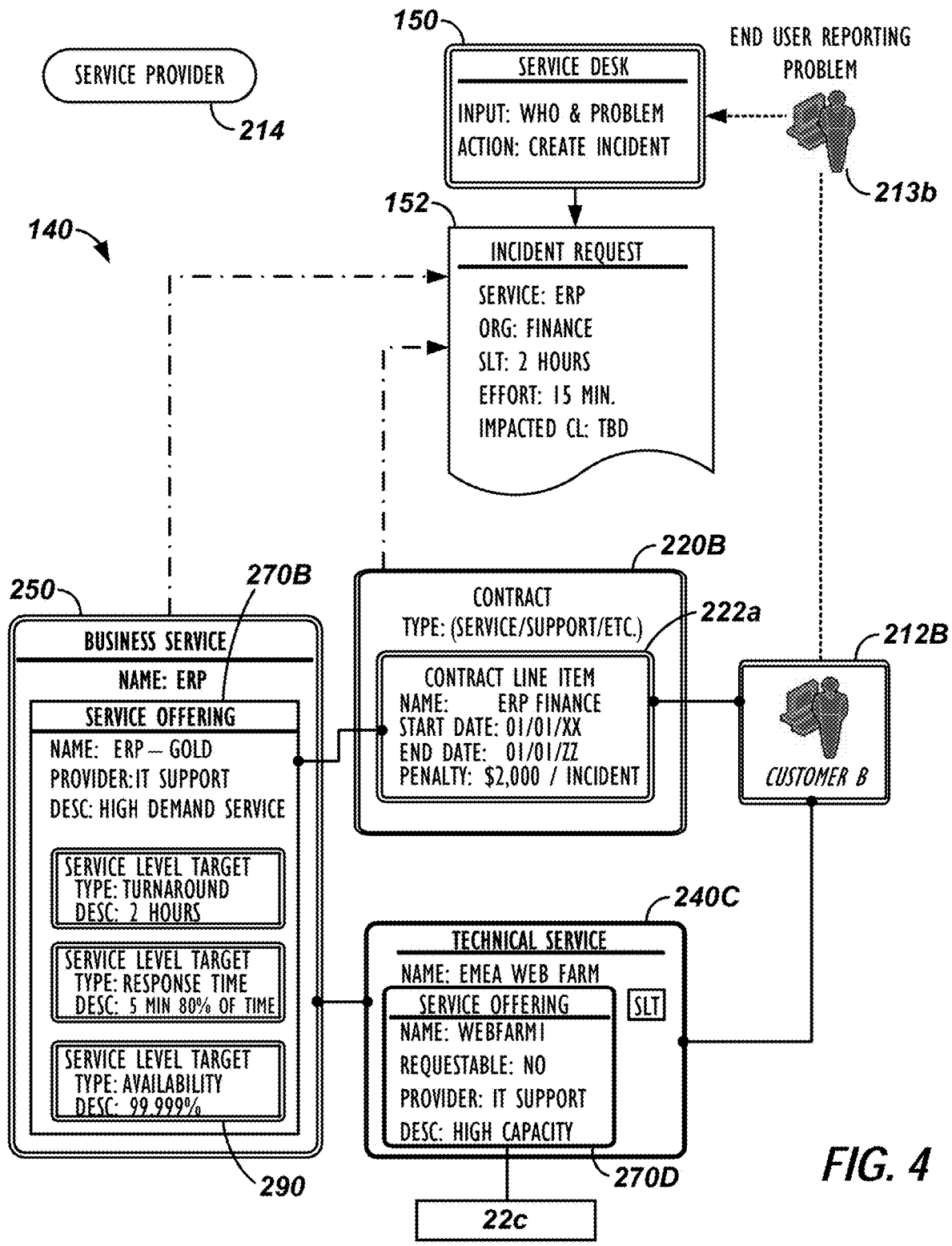
FIG. 4 shows a service desk arrangement for handling incidents in the service model architecture.

FIG. 4 schematically shows one arrangement of a service desk environment 150. As shown, agents in the service desk environment 150 can have access to service offerings 270, service level targets 290, contracts 220, contract line items 222, and other elements of the unified service model 140. Features of the unified service model 140 can be presented in any appropriate user interface, editor, and the like for the service desk agents to use. Using such available features, the agent in the service desk environment 150 can handle and manage incidents as well as determine what level of service a given end user is entitled to and what the turnaround time should be to resolve a reported issue. In addition, by linking customers 212 via contracts 220 and contract line items 222 to service offerings 270, the unified service model 140 enables the agents in the service desk environment 150 to proactively notify only specific end users (customers) tied to or associated with particular services 240/250 that will be impacted when a change request or other modification is executed to take a particular infrastructure component offline or to make some other repair.

In the example of FIG. 4, agents in the service desk environment 150 handle incidents (outages, reduced service quality, etc.) that may occur as the service provider 30 provides the services 230 in the IT infrastructure 20 for the customers 40. When an incident occurs, the agent in the service desk environment 150 receives a call from a customer 212. The BSM architecture (100) may also automatically detect, collect, and report alarms, notifications, or other event details to the agent in the service desk environment 150 using automated techniques for service models.

In this example, an end user from the EMEA group 213b may contact the service desk agent to report a problem that she has encountered. Working with the end user 213, the agent in the service desk environment 150 links the user's details to a new incident request 152. The end user 213 may explain that she gets an error message when she opens an ERP system available to her business group. For example, the error message may state, "Connection cannot be established."

Accordingly, the agent in the service desk environment 150 selects the ERP service 250 for the incident request 152 and indicates the organization ("Finance") based on the end user's affiliation. At this point, the computer application offering the unified service model 140 in the environment determines the Service Level Agreement (SLA) covering the particular customer 212B, group 213b, etc. to determine when the incident needs to be resolved. From this, the service level target (i.e., 2 hour turnaround) is indicated in the incident request 152. This target comes from one of the service level targets 290 in the service offering 270A associated with the ERP service 250.

In the incident request 152, however, the agent in the service desk environment 150 does not link the incident to specific infrastructure components 22 at this point because it is not yet clear which infrastructure components 22 may be causing the problem. Before saving the incident request 152, the agent 150 specifies the time (15 min.) that he spent on the incident request 152 so that this effort will be associated with any accounting for the ERP service 250 by associated service level targets 290.

Using this incident request 152, the unified service model 140 can then be used to track if, when, and how certain service level targets 290 of the service offerings 270A are either met or not met by the service provider(s), infrastructure 20, etc. The service model 140 can thereby track a given incident occurring in relation a service offering and can maintain an accounting for the tracked incident by using defined measures in the contract line items 222 and the service level targets 290. This information can be stored in the CMDB (110) or elsewhere. Once incidents have been resolved, reports can then be generated that capture the rolled up cost of delivering the service 250 and handling the incidents for the customer 212B.

Additionally, impact management information and change request information can be handled in the service desk environment 150 to allow agents to determine and manage the impact of an incident in the infrastructure 20 to other services and to make changes to the unified service model 140's configuration in the CMDB (110) and elsewhere. Moreover, although the service desk environment 150 has been described in terms of handling an incident, the same methodology can be used to handle requests from customers for requestable offerings 280 with their associated service level targets 290 and measures.

E. Other Elements

Figures 5, 6:
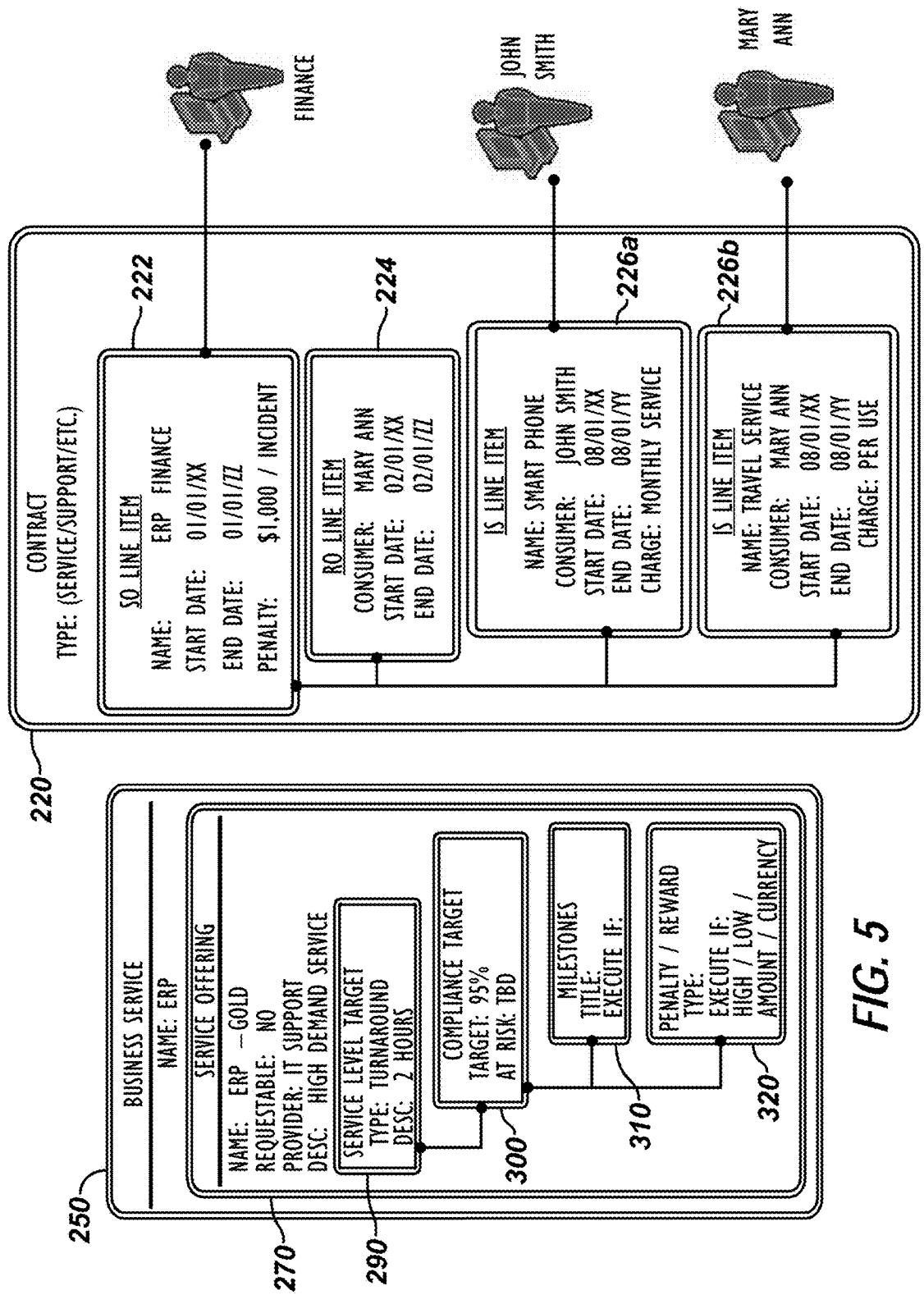
FIG. 5 shows a business service having a service offering with compliance targets and other constructs.
FIG. 6 shows a contract having several types of line items.

The class structure 200 of FIG. 2A can have additional constructs for use in the disclosed unified service model 140. On such construct is a compliance target 300 shown in FIG. 5. The compliance target 300 captures target goals for a specified service level target 290. The compliance target 300 is aligned with a compliance object defined in service management objectives when instrumenting how compliance with a service level target 290 will be will be derived. Compliance targets 300 can be associated to one or more service level targets 290. In the example of FIG. 5, the service level target 290 specifies a turnaround for a service offering 270 of two hours. This service level target 290 has a compliance target 300 associated with it that specifies that 95% of incidences handled for the service are targeted to comply with the service level target's turnaround of 2 hours. In this way, the compliance target 300 can be used in the service model 140 for further tracking and monitoring of information and incidents for associated service level targets 290.

Additional elements can be defined for a compliance target 300, such as milestones 310 and penalty/reward 320. The milestone 310 may include notifications, actions, or other activities that are to be executed if a certain predefined circumstance (milestone) associated with the compliance target 300 occurs. As one example, a milestone 310 may include "at risk," indicating that the provider organization 210 is at risk of violating a service target 290. A certain action may then be specified if and when this "at risk" milestone is met. For example, a warning or alarm may be triggered, and a notification message may be sent to an administrator. These and other milestones are possible.

The penalty/reward 320 can define whether a certain amount of money, credit, time, or other unit-of-measure is to be applied to the service level target 290 when the compliance target 300 is met or not met. These and other detailed constructs can be included in service offerings 270 and service level targets 290 in the unified service model 140 to achieve various management and tracking purposes.

Other constructs are shown in FIG. 6 in which a contract 220 is illustrated. As discussed previously, the contract 220 can include one or more contract line items 222 that define specifics about the contract 220. The contract line item 222 shown here is referred to as a service offering (SO) line item because it is associated with a service offering as discussed previously. The SO line item 222 can be have further constructs, including one or more requestable offering (RO) line items 224 and one or more individual service (IS) line items 226.

As previously discussed, the SO line item 222 can be used to establish specific agreements for a given service offering between a service provider and a customer. The SO line items 222 are subordinate to its contract 220, and each SO line item 222 is related to exactly one service offering. Thus, the contract 220 may have multiple SO line items 222 for different service offerings. In general, the SO line items 222 can be related to Service Level Agreements (SLAs), Operational Level Agreements (OLA), and Underpinning Contracts (UPC). In the example of FIG. 6, the SO line item 222 defines a start date and an end date for a service offering and a penalty for incidents occurring in relation to the service offering under the contract 220.

The requestable offering (RO) line item 224 captures the agreement between a customer and the service provider for a defined requestable offering. Thus, the RO line item 224 is derived from a requestable offering (280), and the item 224 supports service requests for that offering (280). As shown, the RO line item 224 is subordinate to the SO line item 222 and can be related to none or more service requests. In this example, the RO line item 224 applies to a particular customer (Mary Ann) and has start and end dates when the requestable offering is available to the customer.

The Individual Service (IS) line items 226 define the terms for supporting and tracking any on-going services beyond the deployment activities associated with a given service request. For example, once a new smart phone service has been set up to work in the infrastructure 20, the IS line item 226a may define an agreement for ongoing support for a particular customer (i.e., an end user named John Smith) that runs for a period of time. This item 226a may even indicate a monthly service charge for support and tracking purposes. In another example, an IS line item 226b can define online access to an outsourced travel service by a particular customer (i.e., an end user named Mary Ann). Once the account is set up, the IS line item 226b can define a per instance usage of the outsourced travel service requested by the particular customer so the usage can be charged back to the customer (and associated organization). These and other detailed constructs can be included in contracts 220 used to associate customers 212 with service offerings 270 in the unified service model 140.

The techniques of the present disclosure can be implemented in digital electronic circuitry, in computer hardware, firmware, software, or in combinations of these. Apparatus for practicing the disclosed techniques can be implemented in a computer program product tangibly embodied in a machine-readable storage device for execution by a programmable processor; and method steps of the disclosed techniques can be performed by a programmable processor executing a program of instructions to perform functions of the disclosed techniques by operating on input data and generating output. The disclosed techniques can be implemented advantageously in one or more computer programs that are executable on a programmable system including at least one programmable processor coupled to receive data and instructions from, and to transmit data and instructions to, a data storage system, at least one input device, and at least one output device.

Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Accordingly, a networked computer system can have a plurality of computers communicatively coupled together. At least one of the computers can be programmed to perform at least a portion of the techniques disclosed herein so that the disclosed techniques can be performed collectively by the computers.

Storage devices suitable for tangibly embodying computer program instructions and data can include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method for managing a business service management computing infrastructure using a service model, the method comprising:
   generating a plurality of technical services, each implementing at least one first component of a physical infrastructure of a computer network, the plurality of technical services including at least one first offering configured to provide utility for one of the plurality of technical services,
      the at least one first offering including a plurality of first service level targets used to measure a performance of the at least one first offering;
   generating a plurality of business services, each providing a business service management function, the plurality of business services including at least one second offering configured to provide utility for one of the plurality of business services,
      the at least one second offering being configured to use one or more of the plurality of technical services,
      the at least one second offering including a plurality of second service level targets used to measure a performance of the at least one second offering;
   generating a plurality of contracts each including at least one contract-item,
      the at least one contract-item being associated with a customer,
      the at least one contract-item being linked to at least one of the at least one first offering and the at least one second offering, and defining one or more measures for tracking one or more events occurring within the computer network in conjunction with operations of the plurality of technical services and the plurality of business services, relative to the first service level targets and the second service level targets;
   generating the service model using a second component of the physical infrastructure, the service model including the plurality of technical services, the plurality of business services, and the plurality of contracts;
   storing the service model as a data structure within a configuration management data base (CMDB) that is accessible by way of a service model application program interface (API), by which the customer subscribes to at least one of the at least one first offering and the at least one second offering;
   tracking the one or more events within the computer network to thereby update the service model via the service model API to assess the one or more events relative to the one or more measures; and
   updating, based on the updated service model, one or more of the plurality of business services, the plurality of technical services, and the at least one first component in the physical infrastructure for the customer by using the at least one first offering, the at least one second offering, the plurality of first service level targets and the plurality of second service level targets.

2. The method of claim 1, wherein the plurality of first targets define a time limit for handling an incident or a request related to the at least one first offering.

3. The method of claim 1, wherein the plurality of first targets define an availability level or a capacity level expected for the at least one first offering.

4. The method of claim 1, wherein the plurality of first targets define a response time expected for the at least one first offering.

5. The method of claim 1, wherein
   the at least one first offering links utility in the business service to a first service warranty in the plurality of first service level targets, and
   the at least one second offering links utility in one or more of the plurality of technical services to a second service warranty in the plurality of second service level targets.

6. The method of claim 1, wherein the at least one contract-item includes a time frame in which a selected first offering is available to the customer.

7. The method of claim 1, wherein the at least one contract-item includes a first measure to track an event occurring in the service model.

8. The method of claim 1, further comprising:
   indirectly exposing the technical service to the customer via the at least one first offering; and
   indirectly exposing the business service to the customer via the at least one first offering of the contract-item in the contract.

9. The method of claim 7, wherein
   the event includes an incident,
   the managing includes tracking the incident using the plurality of first service level targets, and
   maintaining an accounting for the tracked incident using the measure.

10. The method of claim 9, wherein the measure includes a value assigned to the accounting when the tracked incident causes the first target to be missed.

11. The method of claim 7, wherein
    the event includes a request,
    the managing includes tracking the request using the plurality of first service level targets, and
    maintaining an accounting for the tracked request using the measure.

12. The method of claim 7, wherein
    the event includes a usage,
    the managing includes tracking the usage, and
    maintaining an accounting for the tracked usage by using the measure.

13. The method of claim 7, further comprising:
    associating a second customer to one of the at least one first offering using a second contract-item of the contract; and
    generating a second measure in the contract to track a second event occurring in the service model relative to the second customer.

14. The method of claim 1, further comprising:
    generating a plurality of third offerings, each of the plurality of third offerings being configured to associate a third service, delivered by at least one second component in the computing infrastructure;
    generating a plurality of third offering-target pairs by associating each of the plurality of third offerings with a different third target, the different third target including a different service level target for each of the plurality of third offerings;
    implementing a second technical service as the plurality of third offering-target pairs; and
    associating the second technical service with the first offering using the second component.

15. The method of claim 14, further comprising:
    associating a second customer with the second technical service via one of the plurality of third offerings.

16. The method of claim 14, further comprising:
    indirectly exposing the third service to a second customer via the first offering of the contract-item in a contract associated with the second customer.

17. A non-transitory programmable storage device having programmed instructions stored thereon for causing a programmable control device to:

generate a plurality of technical services, each implementing at least one component of a physical infrastructure of a computer network, the plurality of technical services including at least one first offering configured to provide utility for one of the plurality of technical services, the at least one first offering including a plurality of first service level targets used to measure a performance of the at least one first offering;

generate a plurality of business services, each providing a business service management function, the plurality of business services including at least one second offering configured to provide utility for one of the plurality of business services, the at least one second offering being configured to use one or more of the plurality of technical services, the at least one second offering including a plurality of second service level targets used to measure a performance of the at least one second offering;

generate a plurality of contracts each including at least one contract-item, the at least one contract-item being associated with a customer and linked to at least one of the at least one first offering and the at least one second offering, and defining one or more measures for tracking one or more events occurring within the computer network in conjunction with operations of the plurality of technical services and the plurality of business services, relative to the first service level targets and the second service level targets;

generate a service model, the service model including the plurality of technical services, the plurality of business services, and the plurality of contracts;

store the service model as a data structure within a configuration management data base (CMDB) that is accessible by way of a service model application program interface (API), by which the customer subscribes to at least one of the at least one first offering and the at least one second offering;

track the one or more events within the computer network to thereby update the service model via the service model API to assess the one or more events relative to the one or more measures; and update, based on the updated service model, one or more of the plurality of business services, the plurality of technical services, and the at least one component in the physical infrastructure for the customer by using the at least one first offering, the at least one second offering, the plurality of first service level targets, and the plurality of second service level targets.

* * * * *

UNITED STATES PATENT AND TRADEMARK OFFICE
CERTIFICATE OF CORRECTION

PATENT NO. : 10,867,259 B2
APPLICATION NO. : 12/650302
DATED : December 15, 2020
INVENTOR(S) : Wallace et al.

Page 1 of 1

It is certified that error appears in the above-identified patent and that said Letters Patent is hereby corrected as shown below:

On the Title Page

Column 2, Item (74), in "Attorney, Agent, or Firm", Line 2, delete "Bellermarm" and insert -- Bellermann --, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*